United States Patent [19]

Gruber et al.

[11] 3,991,261

[45] Nov. 9, 1976

[54] ANAEROBICALLY HARDENING ADHESIVES AND SEALANTS CONTAINING ORGANIC NITRONES

[75] Inventors: Werner Gruber, Dusseldorf-Gerresheim; Joachim Galinke, Dusseldorf-Holthausen; Jürgen Keil, Monheim-Hitdorf, all of Germany

[73] Assignee: Henkel & Cie G.m.b.H., Dusseldorf-Holthausen, Germany

[22] Filed: Aug. 25, 1975

[21] Appl. No.: 607,468

[30] Foreign Application Priority Data

Sept. 2, 1974  Germany............................ 2441963

[52] U.S. Cl. ............................... 526/328; 526/230; 526/236

[51] Int. Cl.$^2$ ................ C08F 120/10; C08F 120/14

[58] Field of Search ................. 260/89.5 R, 89.5 A, 260/86.1 E; 526/230, 236, 328

[56] References Cited

UNITED STATES PATENTS

| | | | |
|---|---|---|---|
| 3,625,930 | 12/1971 | Toback et al. ................. | 260/89.5 R |
| 3,775,385 | 11/1973 | Ozono et al. .................. | 260/89.5 A |

*Primary Examiner*—Harry Wong, Jr.
*Attorney, Agent, or Firm*—Hammond & Littell

[57] ABSTRACT

Organic nitrones are stabilizers for anaerobically-setting adhesive compositions wherein the principal adhesive component is a (meth) acrylic acid ester and the catalyst is an organic peroxide. The nitrone improves the storage-stability of the adhesives in contact with air.

13 Claims, No Drawings

ANAEROBICALLY HARDENING ADHESIVES AND SEALANTS CONTAINING ORGANIC NITRONES

BACKGROUND OF THE INVENTION

The invention relates to systems (i.e., compositions) which harden rapidly in the absence of oxygen, based on (meth) acrylic esters and organic peroxides, particularly hyperoxides, which are known as anaerobic adhesives, sealing compounds, and the like, and which contain an agent which improves their storage-stability. They are preferably used in solvent-free form for the above mentioned purposes. The invention includes methods for the preparation of these composition.

As essential components these systems contain monomeric or oligomeric (meth) acrylic esters of mono- or polyvalent alcohols, as well as a peroxide or hydroperoxide. In order to ensure sufficiently rapid hardening in the absence of oxygen, accelerators are added to the systems. For the purpose it is known that, for example, amines, particularly tertiary amines, carboxylic hydrazides, N,N'-dialkyl hydrazines, and carboxylic sulfimides are effective. Many of these accelerators have, however, caused the adhesives to polymerize prematurely in storage and thus to become usable.

Accordingly, a demand has arisen for compositions of the type mentioned which contain an agent which renders the compositions adequately storage-stable but which does not interfere with the beneficial properties of the composition.

RELATED ART

A variety of compositions of the foregoing type are disclosed in U.S. Pat. Nos. 2,626,178; 2,895,950; 3,041,322; 3,043,820; 3,300,547; 3,046,262; 3,218,305; and 3,425,988.

OBJECTS OF THE INVENTION

The principal object of the present invention is to find compounds which prevent the premature polymerization of these adhesives and sealing compounds in the presence of small amounts of air, but at the same time have no adverse effect on the hardening rate when used under anaerobic conditions.

A further object of the invention is to provide a aerostable, anaerobically-setting adhesive composition comprising a polymerizable (meth) acrylate ester as principal latent adhesive component, a peroxide polymerization catalyst therefor, an agent which accelerates the action of the catalyst in the absence of free oxygen but which is essentially inert in the presence of free oxygen, and an agent which renders the composition storage-stable in the presence of molecular oxygen while not adversely effecting the setting time of the adhesive in the presence of oxygen.

BRIEF SUMMARY OF THE INVENTION

The present invention provides an aerostable, anaerobically setting adhesive composition comprising a polymerizable (meth) acrylate ester as principal latent adhesive component, a peroxide or hydroperoxide polymerization catalyst for the ester, and a percarboxylic acid as stabilizer for the composition. The composition may contain one or more stabilizers and one or more auxiliary accelerators. In preferred embodiments the compositions are adequately storage-stable at room temperature in the presence of free oxygen, but harden rapidly when used as a cement with exclusion of air, and provide strong metal-to-metal bonds.

According to the invention the anaerobically hardening adhesives and sealing compounds based on (meth)acrylic esters contain nitrones of the general formula

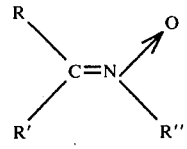

wherein R, R' and R'' denote an alkyl, cycloalkyl, and/or aryl radical, substituted if desired, wherein R can also be hydrogen, and R, R' and R'' also can form a ring. Their addition should be limited to 0.01% to 10% by weight, particularly 0.1% to 5% by weight, based on the weight of the (meth) acrylic ester. The amount varies with regard to the other auxiliary substances, particularly the respective accelerator. The nitrones prevent premature polymerization of the anaerobically hardening adhesives and sealing compounds based on (meth) acrylates and permit thus the preparation of products which are stable in storage. At the same time, however, they possess the favorable property that they decrease the hardening time of the compositions substantially. The nitrones thus possess a double function.

As nitrones can be used both aliphatic and aromatic nitrones. Suitable nitrones are, for example, C-methyl-N-phenyl-nitrone, C-n-propyl-N-benzyl-nitrone, C-phenyl-N-methyl nitrone, C,N-diphenyl-nitrone, C-diphenyl-N-methyl nitrone, 2,3,4,5-tetrahydropyridine-N-oxide, $\Delta^1$-pyroline-N-oxide, etc.

Thus in general the nitrones can be a C,N-di[lower (e.g., $C_{1-6}$) alkyl] nitrone, a C,N-diphenylnitrone, a C-(lower alkyl-N-phenyl nitrone, a C-phenyl-N-(lower alkyl) nitrone, a C-phenyl-N-(aralkyl) nitrone, a C-(aralkyl)-N-phenyl nitrone, and a 4 to 6 membered nitrogen heterocycle containing the structure

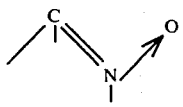

It thus appears that any organic nitrone which is soluble or dispersible in fluid acrylic esters is suitable for use in the present invention.

In preferred embodiments the compositions of the present invention contain an adhesive component [e.g., a (meth) acrylate ester]; a polymerization initiator or catalyst (e.g., a hydroperoxy alcohol); an oxygen adjuvant, a polymerization inhibitor (e.g., a quinone); a stabilizer (e.g., percarbonic acid); an accelerator (e.g., a tertiary amine); and a percarboxylic acid as stabilizer. The components are mutually soluble or homogeneously dispersible.

The anaerobic systems (i.e., compositions) based on (meth) acrylic esters have been known for a long time. These systems are composed, for example, of (meth) acrylic esters of polyvalent alcohols, such as ethylene glycol; diethylene glycol; triethylene glycol; tetraethylene glycol; polyethylene glycol; glycerin; pentanediol; di-, tri-, or tetrapropylene glycol; or the (meth) acrylic esters of dimerized or polymerized cyclopentadienol; or tetrahydrofuryl alcohol, cyclopentanol, or cyclohexanol. The reaction products of glycide ethers of polyvalent phenols with acrylic acid or methacrylic acid provide another group of anaerobically hardening adhesives.

Another essential component of the anaerobically hardening adhesives are the peroxide initiators. These are preferably hydroperoxides which derive from hydrocarbons with a chain length of 3 to 18 carbon atoms. Suitable for example, are cumene hydroperoxide, tert.-butyl hydroperoxide, methyl ethyl ketone hydroperoxide, diisopropyl benzene hydroperoxide. Furthermore, peroxides which have a half life of 10 hours at a temperature between about 80° and 140° C are also suitable. Here we mention particularly tert.-butyl perbenzoate, di-tert.-butyl-diperoxyphthalate, 2,5-dimethyl-2,5-bis-(tert.-butylperoxy)-hexane, bis-(1-hydroxy-cyclohexyl) peroxide; tert.-butyl-peroxyacetate, 2,5-dimethyl-hexyl-2,5-di-(peroxybenzoates), tert.-butylperoxy-isopropyl carbonate, n-butyl-4,4-bis-(tert.-butylperoxy) valerate, 2,2-bis-(tert.-butylperoxy)-butane and di-tert.-butyl peroxide.

The peroxides should be present in an amount of 0.1% to 20%, preferably 1.0% to 10% based on the weight of the total mixture. They are used mostly as phlegmatized solutions or pastes, that is, with a relatively low content of inert substances, for example, dimethyl phthalate or cumene or the like.

According to a preferred embodiment of the invention, an organic amine or hydrazide or sulfimide are added as stabilizers with the compositions of the present invention. In this instance the systems (i.e., compositions) exhibit their best properties with reference to a fast setting time. As amines N,N-dimethyl-o-toluidine, N,N-dimethyl-p-toluidine, and tri-n-butylamine are suitable. As hydrazines the hydrazides of mono esters of carboxylic acid, for example the ethyl and tert.-butyl ester or the hydrazide of acetic acid and of benzoic acid are suitable. Among the sulfimides, benzoic acid sulfimide is preferred. The above-named compounds are used only in relatively small proportions, e.g., from 0.1% to 2.5% by weight.

Finally thickeners, plasticizers, inorganic fillers and dyes can be added to the adhesive and sealing compounds according to the invention. suitable as thickeners are polymeric compounds such as polymethyl methacrylate, polyethyl acrylate, polystyrene, polyvinyl chloride, synthetic rubber and the like. As fillers can be used, for example, finely-divided silicon dioxide, silicates, bentonites, calcium carbonate, and titanium dioxide.

The anaerobic adhesives and sealing compounds according to the invention can be stored for months in partly-filled bottles of glass, polyethylene, etc. without undergoing any change. A relatively low oxygen-partial pressure suffices to inhibit the polymerization. Here as well as in other cases it was found expedient to color the bottles to keep out short-wave light. This has a favorable effect on the stability.

The anaerobically hardening adhesives are used in the industry for cementing metal sheets or metal parts of different materials or for fastening threads, for sealing pipe joints etc. Due to the combination according to the invention it is not necessary to use an additional accelerator, even with relatively inactive metal surfaces. Naturally it is also possible to accelerate the hardening with known means, for example, by slight heating.

In general so-called "hand-resistant" joints are obtained after a few minutes already with the anaerobic adhesives according to the invention. It should be pointed out that the time to obtain a really good strength which permits practical handling, namely the time required to form a bolt-nut joint which possesses a torque breaking strength of at least 50 kpcm, is between about 10 and 30 minutes.

In the specification and claims the term "(meth)acrylate" is used to designate esters of acrylic acid and the esters of methacrylic acid. The esters are termed latent adhesives because they do not develop their adhesives properties until they have polymerized.

The invention is further described in the example which follow. These examples are preferred embodiments of the invention and are not to be continued in limitation thereof.

EXAMPLES 1 to 5

13.5 g of commercial polyethylene glycol dimethacrylate (m.w. approx. 330), which contained 200 p.p.m. of hydroquinone, was mixed with stirring with the additives indicated in Table 1 (columns 2 and 3). Then 750 mg of commercial 70% cumene hydroperoxide was added, and as a last component the amount of N-methyl-C-phenyl nitrone indicated in Table 1. The composition of each example was as follows:

TABLE 1

| Ex. | Benzoic Sulfimide | N,N-Dimethyl-p-toluidine | Nitrone |
| --- | --- | --- | --- |
| 1 | 150 mg. | 150 mg. | 150 mg. |
| 2 | 150 mg. | 75 mg. | 150 mg. |
| 3 | 150 mg. | 75 mg. | 75 mg. |
| 4 | 75 mg. | 75 mg. | 75 mg. |
| 5 | 150 mg. | — | 75 mg. |

The foregoing compositions were tested for:
Hand Strength (A)
Time to reach Torque break point of 50 kpcm. (B)
Strength after 24 hours (C)
Stability at 80° C (D)

A. Hand Strength Test

In the hand strength test, a few drops of the anaerobically hardening adhesive to be tested are placed on the turns of a degreased bolt (M 10 × DIN 933-8.8) and the appropriate nut is screwed over the bolt. From time to time the nut is twisted slightly against the bolt to determine at what time the nut can no longer be turned on the bolt. This time is used as a measure for the hand strength, and is shown in Table 2 (column 2).

B. Time to reach a Torque break point of at least 50 kpcm.

The strength test is carried out on degreased bolts (M 10 × 30 DIN 933-8.8) and nuts. After the bolt and its nuts have been cemented together by means of a few drops of the adhesive, the torque necessary to break the adhesive bond is determined with a torque wrench at intervals of several minutes. The time to reach a torque break point of 50 kpcm or more is taken as the measure of the hand strength. Mean values of five measurements are shown in column 3 of Table 2.

C. Strength after 24 hours

The torque in kpcm required to break up the bond was determined with a torque wrench on cemented bolts and nuts after 24 hours of storage at room temperature. The valves obtained are listed in column 4 of Table 2.

D. Stability

In the stability test, test tubes of 10 cm length and 10 mm width were 9/10 filled with the compositions of Examples 1 to 5, and suspended in a bath maintained at 80° C. The time that elapsed between the suspension of the tubes in the bath and start of the formation of gel was measured. All samples were still gel-free after 1 hour. The values regarding the hand strength, the time of the 50 kpcm strength, and the strength after 24 hours were unchanged. The aging test was stopped, because this test means that the products remain unchanged for over a year at room temperature.

TABLE 2

| Ex. | Hand Strength (minutes) | 50 kpcm Torque (minutes) | Strength After 24 hours (kpcm) |
|---|---|---|---|
| 1 | 5 | 10 | 200 |
| 2 | 5 | 15 | 180 |
| 3 | 7 | 15 | 180 |
| 4 | 11 | 20 | 140 |
| 5 | 25 | 45 | 200 |

We claim:

1. In an aerostable, anaerobically-setting adhesive composition comprising a polymerizable (meth) acrylate ester as principal latent adhesive component, a small but effective amount in the range of 0.1% to 20% by weight based on the weight of said composition of a hydroperoxide polymerization catalyst therefor derived from a hydrocarbon of $C_3$ to $C_{18}$ chain length, and an organic accelerator: a small but effective uniformly distributed amount in the range of 0.01% to 10% by weight based on the weight of said ester, of an organic nitrone as stabilizer for said composition.

2. A composition according to claim 1 wherein the nitrone is an N-alkyl-C-arylnitrone.

3. A composition according to claim 1 wherein the nitrone is N-methyl-C-phenylnitrone.

4. A composition according to claim 1 wherein the accelerator is a sulfimide.

5. A composition according to claim 1 wherein the accelerator is benzoic sulfimide.

6. A composition according to claim 1 containing an organic amine as accelerator.

7. A composition according to claim 6 wherein the accelerator is N,N-dimethyl-p-toluidine.

8. A composition according to claim 1 wherein the (meth) acrylate ester is the ester of two mols of methcrylic acid with one mole of ethylene glycol.

9. A composition according to claim 1 wherein the polymerization catalyst is cumene hydroperoxide.

10. A composition according to claim 1 containing a free radical stabilizer.

11. A composition according to claim 10 wherein the free radical stabilizer is hydroquinone.

12. A method for improving the stability of an aerostable, anaerobically-setting adhesive composition comprising a polymerizable (meth) acrylate ester as principal latent adhesive component, a small but effective amount in the range of 0.1% to 20% based on the weight of said composition of a hydroperoxide polymerization catalyst therefor derived from a hydrocarbon of $C_3$ - $C_{18}$ chain length, and an amine accelerator, which comprises: uniformly incorporating in said composition a small but effective amount, in the range of 0.01% to 10% by weight based on the weight of said ester, of an organic nitrone as stabilizer for said composition.

13. A method according to claim 12 wherein said nitrone is incorporated in said composition after said catalyst and said amine.

* * * * *